United States Patent
Huang et al.

(10) Patent No.: US 8,159,333 B2
(45) Date of Patent: Apr. 17, 2012

(54) ENERGY-EFFICIENT INDOOR LOCALIZATION SYSTEM AND A METHOD OF REDUCING POWER CONSUMPTION OF A RADIO BADGE IN THE INDOOR LOCALIZATION SYSTEM

(75) Inventors: Polly Huang, Taipei (TW); Hao-Hua Chu, Taipei (TW); Chuang-Wen You, Taipei (TW)

(73) Assignee: National Taiwan University (TW)

( * ) Notice: Subject to any disclaimer, the term of this patent is extended or adjusted under 35 U.S.C. 154(b) by 499 days.

(21) Appl. No.: 12/425,185

(22) Filed: Apr. 16, 2009

(65) Prior Publication Data
US 2010/0127836 A1   May 27, 2010

(30) Foreign Application Priority Data
Nov. 25, 2008  (TW) .............................. 97145520 A

(51) Int. Cl.
H04Q 5/22 (2006.01)
G08B 29/00 (2006.01)
G05B 19/00 (2006.01)
G05B 23/00 (2006.01)

(52) U.S. Cl. .......... 340/10.5; 340/5.1; 340/5.2; 340/5.6; 340/10.1

(58) Field of Classification Search ................. 340/10.5, 340/10.1, 5.1, 5.2, 5.6
See application file for complete search history.

(56) References Cited

U.S. PATENT DOCUMENTS

| | | | | |
|---|---|---|---|---|
| 6,972,683 B2 * | 12/2005 | Lestienne et al. | .......... | 340/572.1 |
| 7,242,306 B2 * | 7/2007 | Wildman et al. | .......... | 340/573.1 |
| 7,323,991 B1 * | 1/2008 | Eckert et al. | .......... | 340/572.1 |
| 2004/0199056 A1 * | 10/2004 | Husemann et al. | .......... | 600/300 |
| 2008/0140338 A1 * | 6/2008 | No et al. | .......... | 702/141 |

OTHER PUBLICATIONS

Harvey Weinberg, Using the ADXL202 in Pedometer and Personal Navigation Applications, Analog Devices Inc. 2002, p. 1-3.*

* cited by examiner

*Primary Examiner* — Daniel Wu
*Assistant Examiner* — Emily C Terrell
(74) *Attorney, Agent, or Firm* — Baker & McKenzie LLP

(57) ABSTRACT

A method of reducing power consumption of a radio badge in a localization system is disclosed, in which the radio badge is carried by a tracked target and is provided with a pedometer for detecting a footstep count of the tracked target. The method includes: estimating a velocity of the radio badge according to the footstep count detected by the pedometer; calculating a sleep time from the velocity of the radio badge; and controlling the radio badge to discontinue emitting radio signals during the sleep time. An indoor localization system that performs the method is also disclosed.

11 Claims, 3 Drawing Sheets

ENERGY-EFFICIENT INDOOR LOCALIZATION SYSTEM AND A METHOD OF REDUCING POWER CONSUMPTION OF A RADIO BADGE IN THE INDOOR LOCALIZATION SYSTEM

CROSS-REFERENCE TO RELATED APPLICATION

This application claims priority of Taiwanese Application No. 097145520, filed on Nov. 25, 2008.

BACKGROUND OF THE INVENTION

1. Field of the Invention

The present invention relates to an indoor localization system that is energy efficient, and to a method of reducing power consumption of a radio badge in the indoor localization system, in which a sleep time for the radio badge is determined on the basis of a footstep count of a tracked target carrying the radio badge.

2. Description of the Related Art

Sensor network technologies have experienced significant advances in recent times. This has enabled a variety of applications for sensor networks in consumer electronics. For example, there is an ever-increasing number of commercial and experimental uses of sensor networks for object tracking, such as asset tracking in warehouses, patient monitoring in medical facilities, and using location to infer activities of daily living (ADL) at home.

Traditional localization research has concentrated on improving the accuracy of pinpointing the spatial position of a target. However, practical deployment of localization systems shows that positional accuracy and energy efficiency are of equal importance, especially in the context of sensor networks where energy is at a premium. Energy efficiency of mobile units (e.g., tags or badges) attached to tracked targets is critical for any practical deployment. A highly accurate localization system may be of little use if it requires frequent recharging of the mobile units. Therefore, both positional accuracy and energy efficiency are necessary in the design of localization systems.

Recent work addressed the issue of energy efficiency in localization systems. For example, it was found that in object-tracking sensor network systems, energy efficiency and positional accuracy are often two contradictory goals. By changing the sampling rate of location information, a localization system can trade higher energy consumption for better positional accuracy. Sampling rate here is defined as the rate at which the localization infrastructure and its mobile units are triggered to perform necessary communication and computation in determining positions. For example, sampling rate may be associated with the degree to which the mobile units emit radio signals for reception by the localization infrastructure. Furthermore, these systems have identified a number of basic energy-saving solutions that adaptively reduce the sampling rate with little impact on positional accuracy. Their general mechanisms are to (1) detect or predict the mobility pattern of a tracked target, and (2) then dynamically adjust the sampling rate according to a changing mobility pattern. For example, when a tracked target changes its position slowly, the sampling rate can be reduced for better energy conservation without losing much positional accuracy.

There are two main drawbacks in the existing solutions. First, current adaptation mechanisms, although dynamic, calculate the sampling rate based on heuristics. There is no formal analysis of positional error due to signal noise, communication delay, and sampling delay, which would, given the required positional error boundary specified by the applications, allow the system to derive the ideal sampling rate to provide sufficiently accurate position information, while minimizing the sampling rate, and in turn minimizing energy consumption.

Second, the mobility prediction of current solutions is based on the estimated position information. The velocity is obtained by taking the two most recent estimations and dividing the distance moved by the time elapsed. The predicted moving velocity is inherently inaccurate due to the position estimation errors. The adverse effect is particularly significant when the object is static. The network might continue to sample frequently, erroneously determining that the object is moving due to differences between consecutive position estimations.

SUMMARY OF THE INVENTION

Therefore, the object of the present invention is to provide an energy-efficient indoor localization method, and a method of reducing power consumption of a radio badge in the indoor localization system, in which a sleep time for the radio badge is determined on the basis of a footstep count of a tracked target carrying the radio badge.

According to one aspect of this invention, the method of reducing power consumption of a radio badge in a localization system, in which the radio badge is carried by a tracked target and is provided with a pedometer for detecting a footstep count of the tracked target, comprises: estimating a velocity of the radio badge according to the footstep count detected by the pedometer; calculating a sleep time from the velocity of the radio badge; and controlling the radio badge to discontinue emitting radio signals during the sleep time.

According to another aspect of this invention, the indoor localization system comprises: a radio badge adapted to be carried by a tracked target and capable of emitting radio signals; a pedometer disposed on the radio badge, and detecting and outputting a footstep count of the tracked target; a mobility estimator for estimating a velocity of the radio badge according to the footstep count outputted by the pedometer; and a sampling rate adaptor for calculating a sleep time from the velocity of the radio badge, and for outputting a sleep time signal corresponding to the sleep time. The radio badge receives the sleep time signal and responds thereto by discontinuing emitting of the radio signals during the sleep time.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

In formulating the problem to be solved by the present invention, it is assumed that, given a tracked target, a tolerable amount of positional error measured in distance may be specified for a particular application. The positional error is defined as the difference between the actual (ground-truth) position and that reported from a positioning engine.

Figure 1:
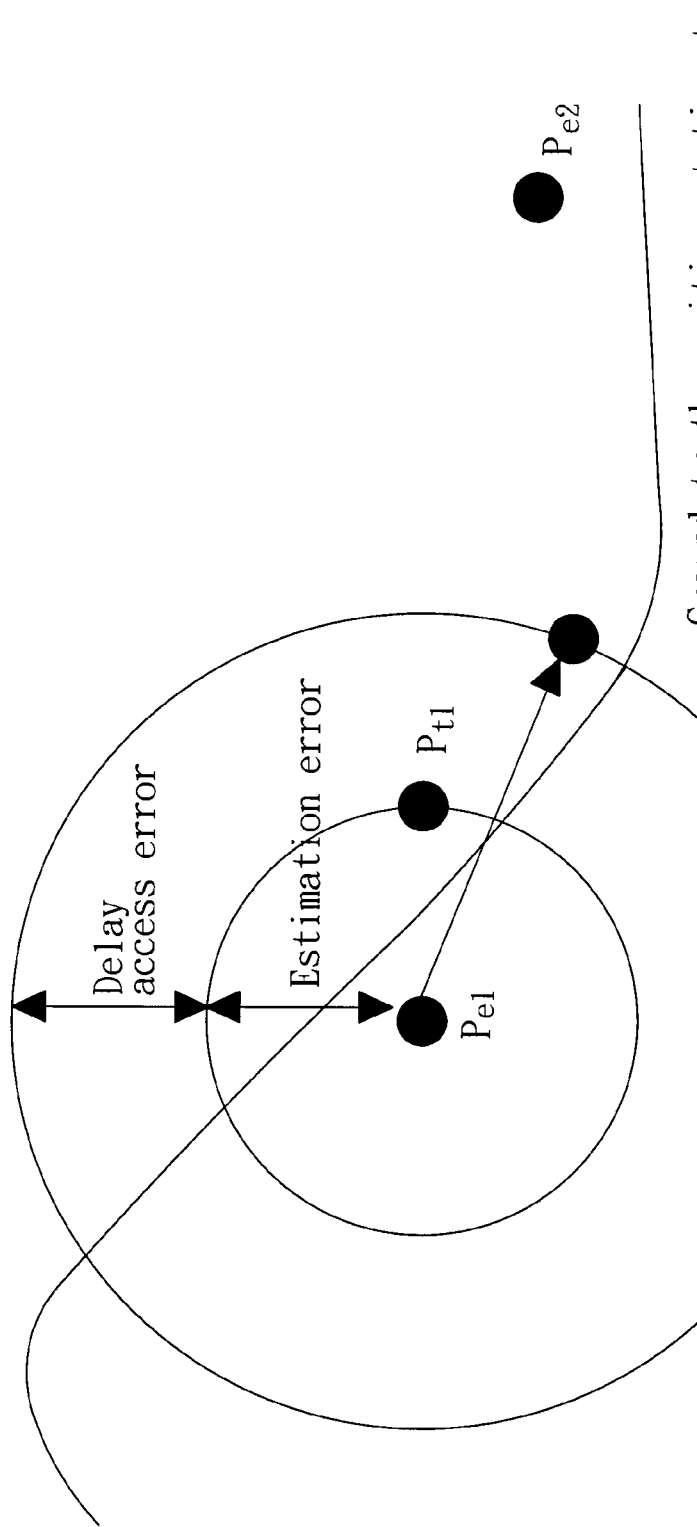
FIG. 1 is a schematic diagram illustrating sources of sampling error that result in a total positional error in an indoor localization system.

Referring to FIG. 1, overall positional error in a localization system comes from two error sources. The first error source is the estimation error from a positioning engine when the positioning engine calculates the position of a tracked target. The positioning engine may mistakenly determine that the object is at $p_{e1}$ instead of $p_{r1}$ because of measurement problems. The second error source is related to the freshness problem of a location sample within a sampling interval. Two consecutive position samples $p_{e1}$ and $p_{e2}$ are calculated for a moving target at times $t_1$ and $t_2$. If an application requests the position of this moving target at time $t_a$, where $t_1 < t_a < t_2$, the position provided to the application is $p_{e1}$, which is no longer the most up-to-date position of this tracked target. In other words, even when the position information estimated by a positioning engine is perfect at the sampling time, the application might still experience positional error that is proportional to the length of the sampling interval, also called the delay access error.

Before deriving a model for positional error, background information is provided with respect to the operation of a localization system of the present invention. Also, associated parameters that impact positional accuracy of the localization system are explained.

The localization system of the present invention is composed of an infrastructure component and a mobile component. The infrastructure component includes beacon nodes installed on, for example, the ceiling of a deployed environment. These beacon nodes use radio (e.g., Zigbee radio) to periodically broadcast beacon packets containing their beacon IDs. Since beacon nodes are hardwired to the building's power source, it is not the aim of the present invention to achieve energy saving with respect to the infrastructure component.

The mobile component includes radio badges carried by tracked persons. Since each radio badge runs on battery power, the energy consumption thereof is the target of the present invention. Each radio badge has the same Zigbee radio as the infrastructure component. Each radio badge can acquire a record of the receiving power of beacon packets, and a sensor network infrastructure relays this record, pairs of beacon IDs, and signal strength (SS) back to the positioning engine which is running on a remote server. This positioning engine runs a hybrid positioning algorithm combining a signal strength (SS) fingerprint and a SS propagation model. Once the positioning engine collects enough SS information from a radio badge, it estimates the radio badge's current position. The current position is forwarded to a location middleware, which then reports the current position to the application. At the same time, the method of the present invention calculates a sleep time for a radio badge, during which the radio interface on the radio badge can be turned off to conserve power.

The details of the positioning algorithm are not the focus of the present invention. Rather, it is stressed that (1) the localization system of the present invention produces estimation error, and (2) there is a processing and networking delay between the time when a radio badge takes SS measurements and the time when the positioning engine calculates the current position of the radio badge.

Based on the above description, the following model is developed to predict the positional error in the localization system of present invention:

$$\text{overall\_error} = \text{estimation\_error} + (\text{pn\_delay} + \text{sleep\_time}) * \text{target\_velocity} \quad (1)$$

The estimation_error in Equation (1) measures the difference in length between the ground-truth position and the estimated position from the positioning engine. The pn_delay denotes the processing and networking delay between the time of SS measurements on a radio badge and the time a position is calculated on a server. Based on experimental measurement results, this delay is relatively small. Therefore, the pn_delay may be considered a known constant given by a localization infrastructure. On the other hand, estimation_error is an unknown variable that can dynamically change based on a localization infrastructure. In the preferred embodiment, the localization system uses an average positional error of 3 meters.

The target_velocity in Equation (1) denotes the current moving speed of a radio badge. Since target_velocity is an unknown dynamic variable, a prediction heuristic is needed to be developed to estimate its current value. The sleep_time is a time interval during which the radio badge turns off its radio interface to conserve power. At the end of the time interval, the radio badge is again activated to allow for the next position sampling. The sleep_time is a control parameter in which the method of the present invention trades higher energy reduction for less positional accuracy.

The second term on the right-hand side of Equation (1) estimates the distance that a radio badge traveling at target_velocity can move away from the last sampled position. It is noted that the second term reaches a peak at the end of a sampling interval. Therefore, the overall_error approximates an upper bound on the positional error within a sleep_time interval.

By setting the error tolerance from an application equal to the overall error in Equation (1), the longest possible sleep_time for a radio badge may be obtained while meeting the specified positional error tolerance. The reason for choosing the longest sleep_time is to maximize the amount of power that is saved since the radio interface on the radio badge is turned off during the sleep_time. Therefore, this longest sleep_time is calculated using the following equation:

$$\text{sleep\_time} = (\text{error-tolerance} - \text{estimation-error})/\text{target\_velocity} - \text{pn\_delay} \quad (2)$$

There is one unknown variable in Equation (2), namely, target_velocity. Since this unknown variable is dynamic over time, the method of the present invention needs to continuously predict the current value of the target_velocity before using Equation (2). In addition, the method of the present invention also needs to change sleep_time based on current predicted values of target_velocity. As shown in Table 1 below, all parameters in the positional error model may be categorized into a control parameter, a known system parameter, an unknown variable requiring prediction, and an application specified input.

TABLE 1

Parameters in the Positional Error Model

| Description | Parameters |
| --- | --- |
| Control parameter (adjusted by method of present invention) | sleep_time |
| Known system parameter (given by a localization system) | pn_delay, estimation_error |

TABLE 1-continued

Parameters in the Positional Error Model

| Description | Parameters |
|---|---|
| Unknown variable (required prediction) | target_velocity |
| Application specified input | error_tolerance |

Figure 2:
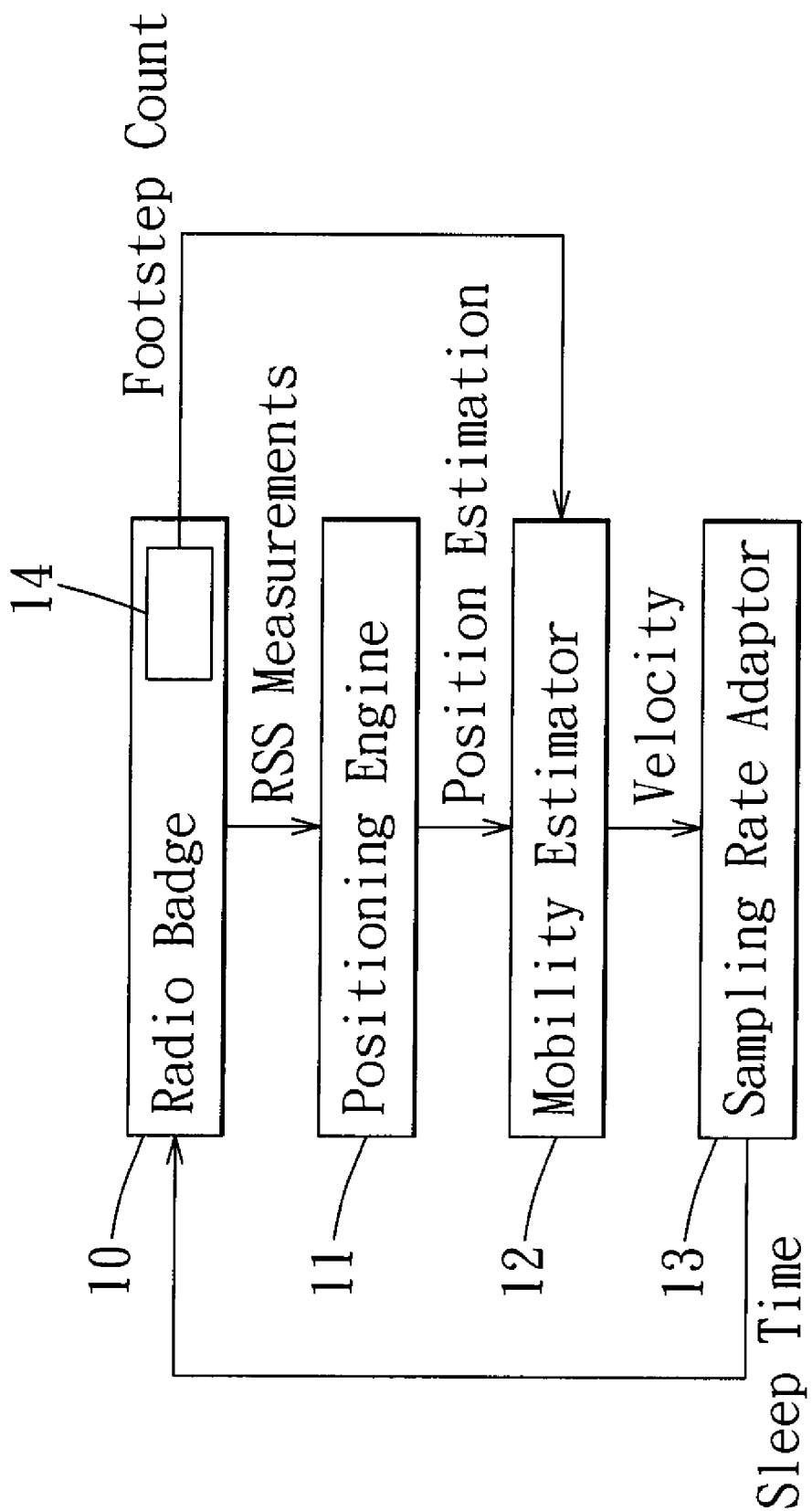
FIG. 2 is a system block diagram of an indoor localization system according to a preferred embodiment of the present invention.

An energy-efficient indoor localization system according to a preferred embodiment of the present invention will now be described with reference to FIG. 2. The indoor localization system includes: a radio badge 10 adapted to be carried by a tracked target and which is capable of emitting radio signals; a pedometer 14 disposed on the radio badge 10, and detecting and outputting a footstep count of the tracked target; a positioning engine 11; a mobility estimator 12; and a sampling rate adaptor 13.

In some embodiments, the mobility estimator 12 and the sampling rate adaptor 13 are included in the radio badge 10. In other embodiments, the mobility estimator 12 and the sampling rate adaptor 13 are included in the positioning engine 11.

Figure 3:
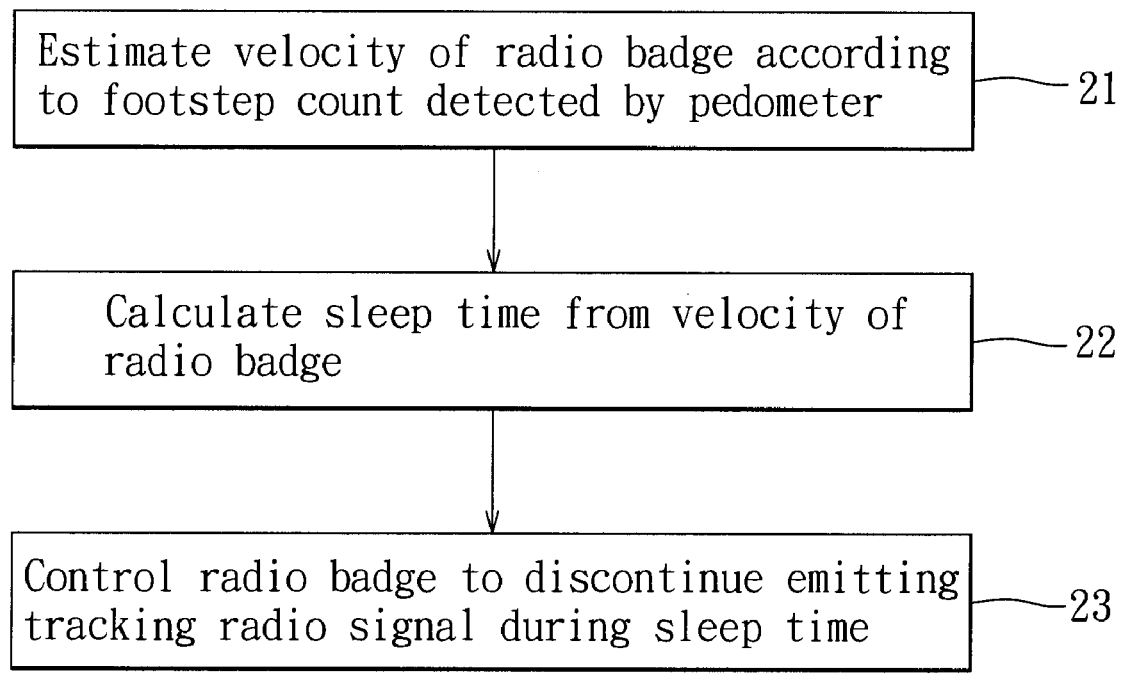
FIG. 3 is a flowchart of a method of reducing power consumption of a radio badge in the indoor localization system of FIG. 2 according to a preferred embodiment of the present invention.

A method of reducing power consumption of a radio badge in a localization system according to a preferred embodiment of the present invention will now be described with reference to FIG. 3. The method is described as being performed by the localization system of FIG. 2.

First, in step 21, the mobility estimator 12 estimates a velocity of the radio badge 10 according to the footstep count detected by the pedometer 14.

Next, in step 22, the sampling rate adaptor 13 calculates a sleep time from the velocity of the radio badge 10.

Finally, in step 23, the radio badge 10 is controlled to discontinue emitting the radio signals during the sleep time. In some embodiments, the sampling rate adaptor 13 outputs a sleep time signal corresponding to the sleep time, and the radio badge 10 receives the sleep time signal and responds thereto by discontinuing emitting of the radio signals during the sleep time. If the velocity estimated by the mobility estimator 12 in step 21 is accurate, the sleep time calculated by the sampling rate adaptor 13 in step 23 is the longest possible sleep time that meets the positional accuracy required for a particular application.

In some embodiments, the pedometer 14 is an accelerometer, in which case step 21 may include the following substeps:

(21-a) obtaining the footstep count of the tracked target during a time interval during which the tracked target is moving by detecting a zero crossing of a reading of the accelerometer;

(21-b) calculating a movement distance by multiplying an average footstep length of the tracked target by the footstep count; and (21-c) obtaining the velocity of the radio badge 10 by dividing the movement distance by the time interval in which the tracked target is moving.

However, the present invention is not limited to such an embodiment of the pedometer 14, and any device may be used for the pedometer 14 that is capable of detecting and outputting a footstep count of the tracked target.

In the preferred embodiment, the sleep time in step 22 is calculated using Equation (2), in which the error_tolerance, estimation_error, and pn_delay of Equation (2) are given application-specific or system parameters (see Table 1), while target_velocity of Equation (2) is the velocity estimated by the mobility estimator 12 in step 21.

In step 23, the radio signals emitted by the radio badge 10 are Zigbee radio signals.

In some embodiments, the positioning engine 11 estimates a position of the radio badge 10 based on a received beacon signal strength outputted by the radio badge 10.

To evaluate the method of the present invention, the applicants conducted experiments to compare the method of the present invention with conventional methods by varying error tolerance, as well as the mobility level of the tracked target. Two efficiency indicators were measured and compared during the experiments, namely, power consumption and non-conformance rate. Power consumption measures an average power consumption per second for a tracked radio badge. During the experiments, power consumption was measured by collecting real data and code traces from a radio badge while it is running in a real environment and then feeding the code traces to a power estimation tool. Non-conformance rate measures the rate at which the reported location from an indoor localization system in an application exceeds the specified error tolerance. The experimental results indicated that, compared with conventional methods, the method of the present invention has a better power efficiency and a lower non-conformance rate.

In sum, through use of the pedometer 14 for estimation of the velocity of the radio badge 10, as well as a positional error model to compute the longest sleep time during which the radio badge 10 may discontinue emission of radio signals, a better power efficiency and a lower non-conformance rate are achieved by the method and system of the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of reducing power consumption of a radio badge in a localization system, the radio badge being carried by a tracked target and being provided with a pedometer for detecting a footstep count of the tracked target, said method comprising:
    (a) estimating a velocity of the radio badge according to the footstep count detected by the pedometer;
    (b) calculating a sleep time from the velocity of the radio badge; and
    (c) controlling the radio badge to discontinue emitting radio signals during the sleep time;
    wherein, in step (b), the sleep time is calculated using the following equation:

sleep time=(error tolerance−estimation error)/velocity−processing and network delay, where error tolerance, estimation error, and processing and network delay are given application-specific or system parameters, and velocity is the velocity estimated in step (a).

2. The method of claim 1, the pedometer being an accelerometer, wherein step (a) includes:
    (a1) obtaining the footstep count of the tracked target during a time interval during which the tracked target is moving by detecting a zero crossing of a reading of the accelerometer;

(a2) calculating a movement distance by multiplying an average footstep length of the tracked target by the footstep count; and (a3) obtaining the velocity of the radio badge by dividing the movement distance by the time interval in which the tracked target is moving.

3. The method of claim 2, wherein, in step (b), the sleep time is calculated using the following equation:

sleep time=(error tolerance−estimation error)/velocity−processing and network delay, where error tolerance, estimation error, and processing and network delay are given application-specific or system parameters, and velocity is the velocity estimated in step (a).

4. The method of claim 2, wherein, in step (c), the radio signals are Zigbee radio signals.

5. The method of claim 1, wherein, in step (c), the radio signals are Zigbee radio signals.

6. An indoor localization system comprising:
a radio badge adapted to be carried by a tracked target and capable of emitting radio signals;
a pedometer disposed on said radio badge, and detecting and outputting a footstep count of the tracked target;
a mobility estimator for estimating a velocity of said radio badge according to the footstep count outputted by said pedometer; and
a sampling rate adaptor for calculating a sleep time from the velocity of said radio badge, and for outputting a sleep time signal corresponding to the sleep time;
wherein said radio badge receives the sleep time signal and responds thereto by discontinuing emitting of the radio signals during the sleep time and wherein the sleep time is calculated by said sampling rate adaptor using the following equation:

sleep time=(error tolerance−estimation error)/velocity−processing and network delay, where error tolerance, estimation error, and processing and network delay are given application-specific or system parameters, and velocity is the velocity estimated by said mobility estimator.

7. The indoor localization system of claim 6, wherein said pedometer is an accelerometer.

8. The indoor localization system of claim 7, wherein said mobility estimator:
obtains the footstep count of the tracked target during a time interval in which the tracked target is moving by detecting a zero crossing of a reading of said accelerometer;
calculates a movement distance by multiplying an average footstep length of the tracked target by the footstep count; and
obtains the velocity of said radio badge by dividing the movement distance by the time interval in which the tracked target is moving.

9. The indoor localization system of claim 8, wherein the radio signals are Zigbee radio signals.

10. The indoor localization system of claim 6, wherein the radio signals are Zigbee radio signals.

11. The indoor localization system of claim 6, further comprising a positioning engine for estimating a position of said radio badge based on a received beacon signal strength outputted by said radio badge.

* * * * *